United States Patent
Chen et al.

(10) Patent No.: US 8,253,401 B2
(45) Date of Patent: Aug. 28, 2012

(54) VOLTAGE CONVERSION APPARATUS

(75) Inventors: Ke-Horng Chen, Taipei County (TW);
Yu-Huei Lee, Taipei County (TW);
Shih-Jung Wang, Taipei (TW);
Chun-Yu Hsieh, Taichung (TW);
Ying-Hsi Lin, Hsin-Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 412 days.

(21) Appl. No.: 12/557,494

(22) Filed: Sep. 10, 2009

(65) Prior Publication Data

US 2010/0066327 A1 Mar. 18, 2010

(30) Foreign Application Priority Data

Sep. 12, 2008 (TW) ................. 97135033 A

(51) Int. Cl.
*G05F 1/10* (2006.01)
(52) U.S. Cl. ...................................................... 323/282
(58) Field of Classification Search .................. 323/268, 323/273, 275, 282, 284, 285, 299
See application file for complete search history.

(56) References Cited

U.S. PATENT DOCUMENTS

| 6,374,192 B1 * | 4/2002 | Brogle et al. ................. 702/107 |
| 6,583,609 B1 * | 6/2003 | Pardoen ....................... 323/283 |
| 7,876,080 B2 * | 1/2011 | Dwarakanath et al. ....... 323/284 |

FOREIGN PATENT DOCUMENTS

| CN | 101038497 A | 9/2007 |
| TW | 200810337 A | 2/2008 |

* cited by examiner

*Primary Examiner* — Adolf Berhane
*Assistant Examiner* — Yemane Mehari
(74) *Attorney, Agent, or Firm* — Thomas, Kayden, Horstemeyer & Risley, LLP

(57) ABSTRACT

A voltage conversion apparatus includes a DC-to-DC conversion circuit, a sensing circuit, and a compensation circuit. The voltage conversion apparatus is capable of adaptively adjusting the system bandwidth according to the load. The system bandwidth is increased to make the converted voltage responding to the load rapidly when the voltage conversion apparatus is operated at a transient state; and the system bandwidth is decreased to increase the system stability when the voltage conversion circuit is operated at a steady state.

20 Claims, 7 Drawing Sheets

|  | $S_1$ | $S_2$ | $S_3$ | $S_4$ | $T_1$ | $T_2$ | $T_3$ | $T_4$ |
|---|---|---|---|---|---|---|---|---|
| Light Load State | off | off | off | off | on | on | on | on |
| First Gradational Transient State | on | on | on | on | off | off | off | off |
| Second Gradational Transient State | off | off | on | on | on | on | off | off |
| Heavy Load State | off | off | off | off | on | on | on | on |

VOLTAGE CONVERSION APPARATUS

BACKGROUND OF THE INVENTION

1. Field of the Invention

The present invention relates to a voltage conversion apparatus, and more particularly, to a voltage conversion apparatus capable of adjusting system bandwidth according to operating state.

2. Description of the Prior Art

In general, a current mode DC-to-DC buck converter incorporates a compensating circuit following its internal error amplifier to maintain the stability of a closed-loop system. The phase margin of the closed-loop system needs a dominant pole to be maintained as stable. In a conventional way, a capacitor having a large capacitance (usually, at a nanometer scale) is attached to the compensation circuit to generate a dominant pole required by the closed-loop system. However, the capacitor having the large capacitance cannot be integrated into an IC. Thus, the IC needs pins for coupling the capacitor having the large capacitance in the implementation, which adversely affects the response speed of the entire closed-loop system as well as increases the manufacturing costs.

SUMMARY OF THE INVENTION

It is therefore one objective of the present invention to provide a voltage conversion IC incorporating an internal capacitor utilized for generating a dominant pole for frequency compensation. The voltage conversion IC has faster response speed at transient state to solve the above-mentioned problem. The voltage conversion apparatus further utilizes a dynamic zero-compensation technique which is relevant to the load state so that the entire system can always be kept as a single-pole system in each steady load state, thereby ensuring system stability.

A voltage conversion apparatus is disclosed according to one exemplary embodiment of the present invention. The voltage conversion apparatus includes a DC-to-DC conversion circuit, a sensing circuit, and a compensation circuit. The DC-to-DC conversion circuit is implemented for converting an input voltage to output a converted voltage. The sensing circuit is coupled to the DC-to-DC conversion circuit, and implemented for sensing the DC-to-DC conversion circuit to determine an operating state of the voltage conversion apparatus and generating a sensing signal. The compensation circuit is coupled to the sensing circuit, and implemented for compensating the DC-to-DC conversion circuit according to the sensing signal in order to adjust a bandwidth of the voltage conversion apparatus; wherein, the compensation circuit adjusts the bandwidth to refer to a first bandwidth when the operating state is a transient state, and the compensation circuit adjusts the bandwidth to refer to a second bandwidth when the operating state is a steady state. The first bandwidth is larger than the second bandwidth.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2B is a diagram illustrating operations of each switching component of the adaptive capacitive component shown in FIG. 2A at different states.

DETAILED DESCRIPTION

Figure 1:
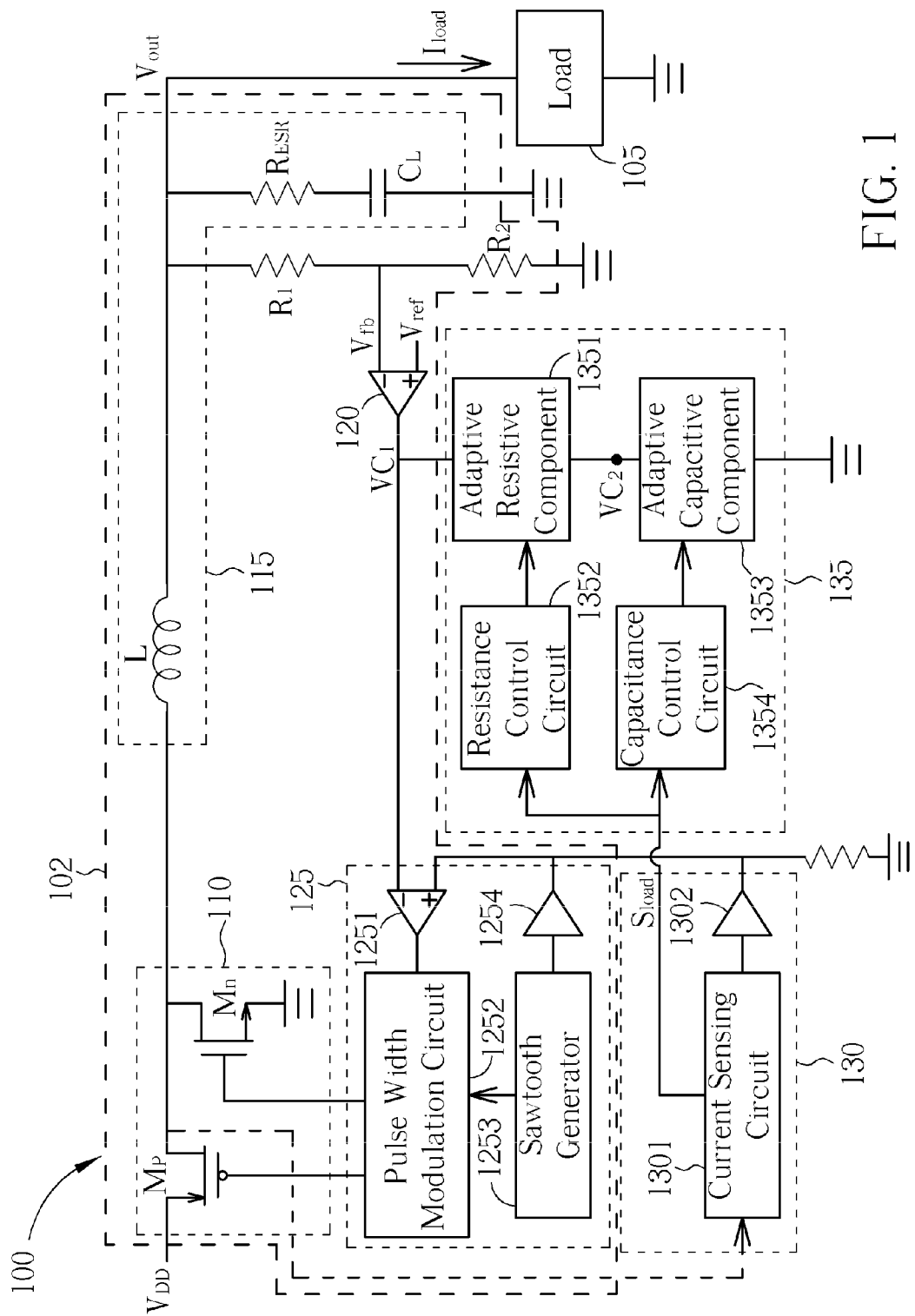
FIG. 1 is a diagram of a voltage conversion apparatus according to one exemplary embodiment of the present invention.

Please refer to FIG. 1, which illustrates a diagram of a voltage conversion apparatus according to an exemplary embodiment of the present invention. A voltage conversion apparatus 100 is implemented for converting an input voltage $V_{DD}$ to output a converted voltage $V_{OUT}$ to the load 105. The voltage conversion apparatus 100 comprises a current mode DC-to-DC buck converter 102, a sensing circuit 130, and an adaptive compensation circuit 135. The current mode DC-to-DC buck converter 102 comprises a switching circuit 110, a filter 115, an error amplifier 120, and a pulse width modulation (PWM) circuit 125.

As shown in FIG. 1, the switching circuit 110 is comprised of two switching transistors $M_p$ and $M_n$. The filter 115 is comprised of an inductor L, a resistor $R_{ESR}$, and a capacitor $C_L$. The PWM circuit 125 comprises a comparator circuit 1251, a PWM control circuit 1252, a sawtooth generator 1253, and a voltage-to-current converter 1254. The sensing circuit 130 comprises a current sensing circuit 1301 and a voltage-to-current converter 1302. The adaptive compensation circuit 135 comprises an adaptive resistive component 1351, a resistance control circuit 1352, an adaptive capacitive component 1353, and a capacitance control circuit 1354. Detailed descriptions about the voltage conversion apparatus 100 are explained in the following.

Firstly, the switching circuit 110 receives an input voltage $V_{DD}$, and determines whether to output the input voltage $V_{DD}$ to the filter 115 according to a PWM signal generated by the PWM circuit 125. Then, the filter 115 is implemented for filtering the output signal (which is the input voltage $V_{DD}$) output by the switching circuit 110 in order to generate a converted voltage $V_{OUT}$ to the load 105. For making the converted voltage $V_{OUT}$ conform to the required voltage, the voltage conversion apparatus 100 controls the switching circuit 110 to adjust the converted voltage $V_{OUT}$ by means of feedback.

As shown in FIG. 1, on the feedback path, the error amplifier 120 receives a reference voltage $V_{ref}$ and a feedback voltage $V_{fb}$ to generate a control signal $VC_1$. More precisely, the error amplifier 120 amplifies an error between the reference voltage $V_{ref}$ and the feedback voltage $V_{fb}$ to generate the control signal $VC_1$. The feedback voltage $V_{fb}$ is generated by the voltage divider composed of resistors R1 and R2 (that is, the feedback voltage $V_{fb}$ corresponding to the converted voltage $V_{OUT}$). The PWM circuit 125 generates the PWM signal to control the On/Off state of the switching components $M_p$ and $M_n$ in the switching circuit 110 according to the control signal $VC_1$.

The sensing circuit 130 senses a node current of the current mode DC-to-DC buck converter for the purpose of determining the operating state of the voltage conversion apparatus 100, and then generates a sensing signal. The adaptive compensation circuit 135 then receives the sensing signal $S_{load}$ and adaptively compensates the control signal $VC_1$ according to the sensing signal $S_{load}$ in order to adjust the bandwidth of the voltage conversion apparatus 100.

According to one exemplary embodiment of the present invention, the sensing circuit 130 detects the node current of the output terminal of the switching circuit 110 to determine the present operating state of the voltage conversion apparatus 100. For example, the load current varies correspondingly with the variation of the load 105; likewise, the node current of output terminal of the switching circuit 110 varies correspondingly with the load. At this time, the sensing circuit 130 detects a variation about the node current of the output terminal of the switching circuit 110 further to determine that the voltage conversion apparatus 100 is operating at the transient state, and accordingly generates the sensing signal $S_{load}$ to the adaptive compensation circuit 135 for the purpose of adjusting the bandwidth of the voltage conversion apparatus 100. On the contrary, when the load does not vary at all, the load current $I_{load}$ and the node current of the output terminal of the switching circuit 110 will be both steady. At this time, the sensing circuit 130 detects the node current of the output terminal of switching circuit 110 is steady, thereby determining that the voltage conversion apparatus 100 is operating at the steady state, and accordingly generates the sensing signal $S_{load}$ to the adaptive compensation circuit 135 for the purpose of adjusting the bandwidth of the voltage conversion apparatus 100.

For ensuring the voltage conversion apparatus 100 has a dominant pole at very low frequency when operating at the steady state and has a faster response speed when operating at the transient state, the adaptive compensation circuit 135 will not use a external capacitor with large capacitance, but instead use the capacitance control circuit 1354 to control the capacitance of the adaptive capacitive component 1353. In this way, the adaptive capacitive component 1353 can have a small capacitance at the steady state while having a large capacitance at the transient state in order to meet the objectives of faster response speed and the dominant pole being at very low frequency when operated at the steady state. Furthermore, the voltage conversion apparatus 100 of the present invention has a larger bandwidth at the transient state in order to increase the system response speed, and has a smaller bandwidth at the steady state to increase the system stability.

Figure 2A:
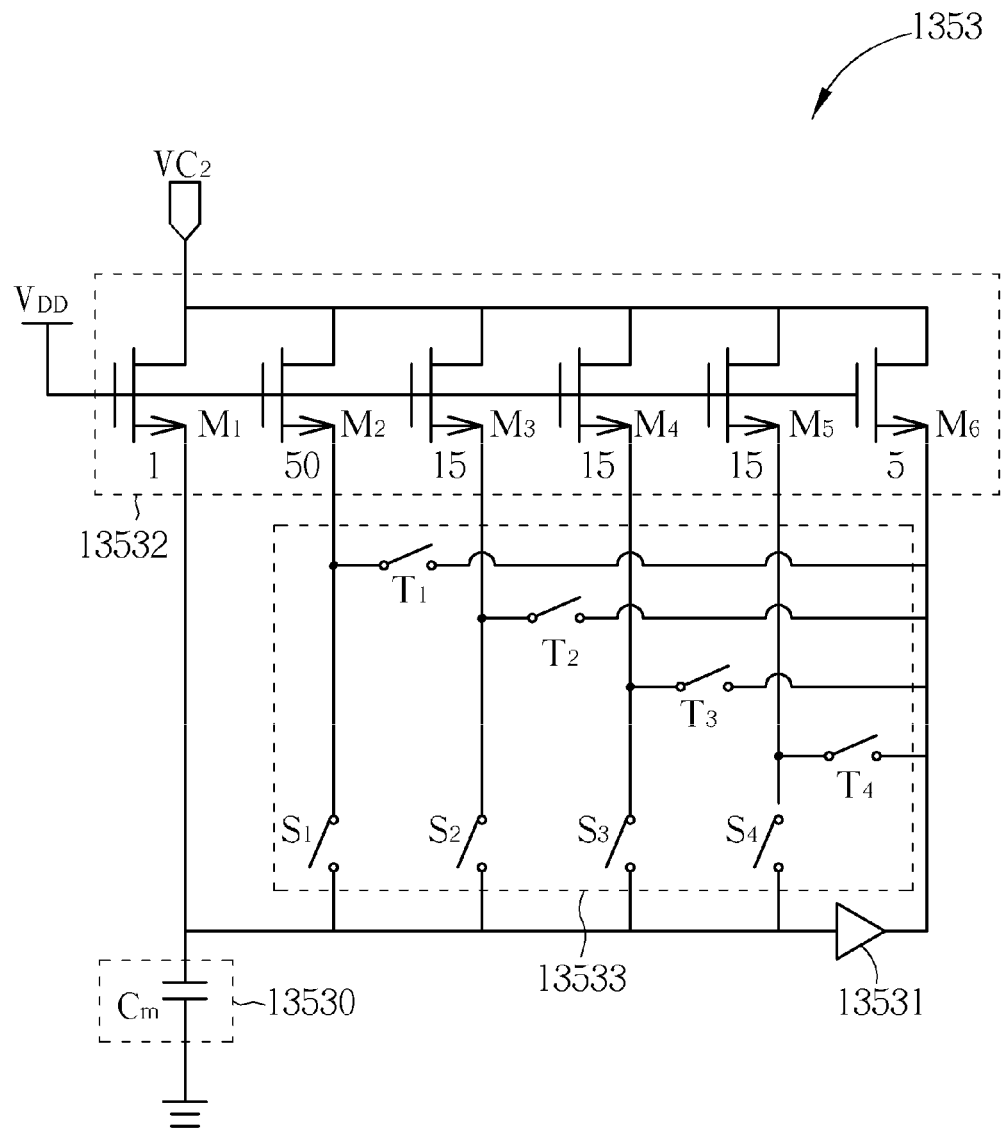
FIG. 2A is a diagram of the adaptive capacitive component shown in FIG. 1 according to one exemplary embodiment of the present invention.

Please refer to FIG. 2A and FIG. 2B simultaneously. FIG. 2A is an exemplary diagram illustrating the adaptive capacitive component 1353 shown in FIG. 1. FIG. 2B is a diagram illustrating operations regarding each switching component of the adaptive capacitive component 1353 shown in FIG. 2A operated at different states. The adaptive capacitive component 1353 includes a capacitor 13530 having a fixed small capacitance $C_m$, a voltage follower 13531, a current mirror circuit 13532 comprised of several transistors $M_1$-$M_6$ and a switching circuit 13533 comprised of several and different switching components $S_1$-$S_4$ and $T_1$-$T_4$.

The size-ratios of transistors $M_1$-$M_6$ are labeled in FIG. 2A, accordingly. As shown in FIG. 2A, by properly designing the size-ratios of transistors $M_1$-$M_6$ and utilizing the voltage follower 13531, the capacitance control circuit 1354 shown in FIG. 1 can control the On/Off state regarding the switching components $S_1$-$S_4$ and $T_1$-$T_4$ according to the sensing signal $S_{load}$ in order to dynamically adjust the amount of the current flowing into the capacitor 13530, which can be deemed equivalent to dynamically adjust the capacitance of the adaptive capacitive component 1353. For example, when the sensing signal $S_{load}$ shows that the operating state of the voltage conversion apparatus 100 is switched from the transient state to the steady state (which could be at a light load state or a heavy load state), the capacitance control circuit 1354 will turn off the switching components $S_1$-$S_4$ and turn on the switching components $T_1$-$T_4$. As a result, though the amount of the current flowing into the adaptive capacitive component 1353 is 101×I, the amount of the current flowing into the capacitor 13530 is merely I. The total equivalent capacitance of the adaptive capacitive component 1353 will therefore be 101×$C_m$. Hence, in this embodiment, a large capacitance at the steady state of the voltage conversion apparatus 100 is accomplished by means of utilizing a small capacitor 13530 in order to provide the voltage conversion apparatus 100 with a dominant pole at very low frequency. Moreover, the adaptive capacitive component 1353 is already disposed inside a chip, so there is no need for additional pins.

If the sensing signal $S_{load}$ shows that the operating state of the voltage conversion apparatus 100 is switched from the steady state into the transient state (such as the first gradational transient state shown in FIG. 2B), the capacitance control circuit 1354 will turn off the switching components $T_1$-$T_4$ and turn on the switching components $S_1$-$S_4$. Meanwhile, the amount of the current which flows into the adaptive capacitive component 1353 is still 101×I, and the current flowing into the capacitor 13530 is only 96×I, making the total capacitance of the adaptive capacitive component 1353 equivalent to 101/96×$C_m$. The equivalent capacitance of the adaptive capacitive component 1353 is sufficiently small so that the bandwidth of the voltage conversion apparatus 100 is increased. In other words, the voltage conversion apparatus 100 has a faster response speed at transient state.

Figure 2C:
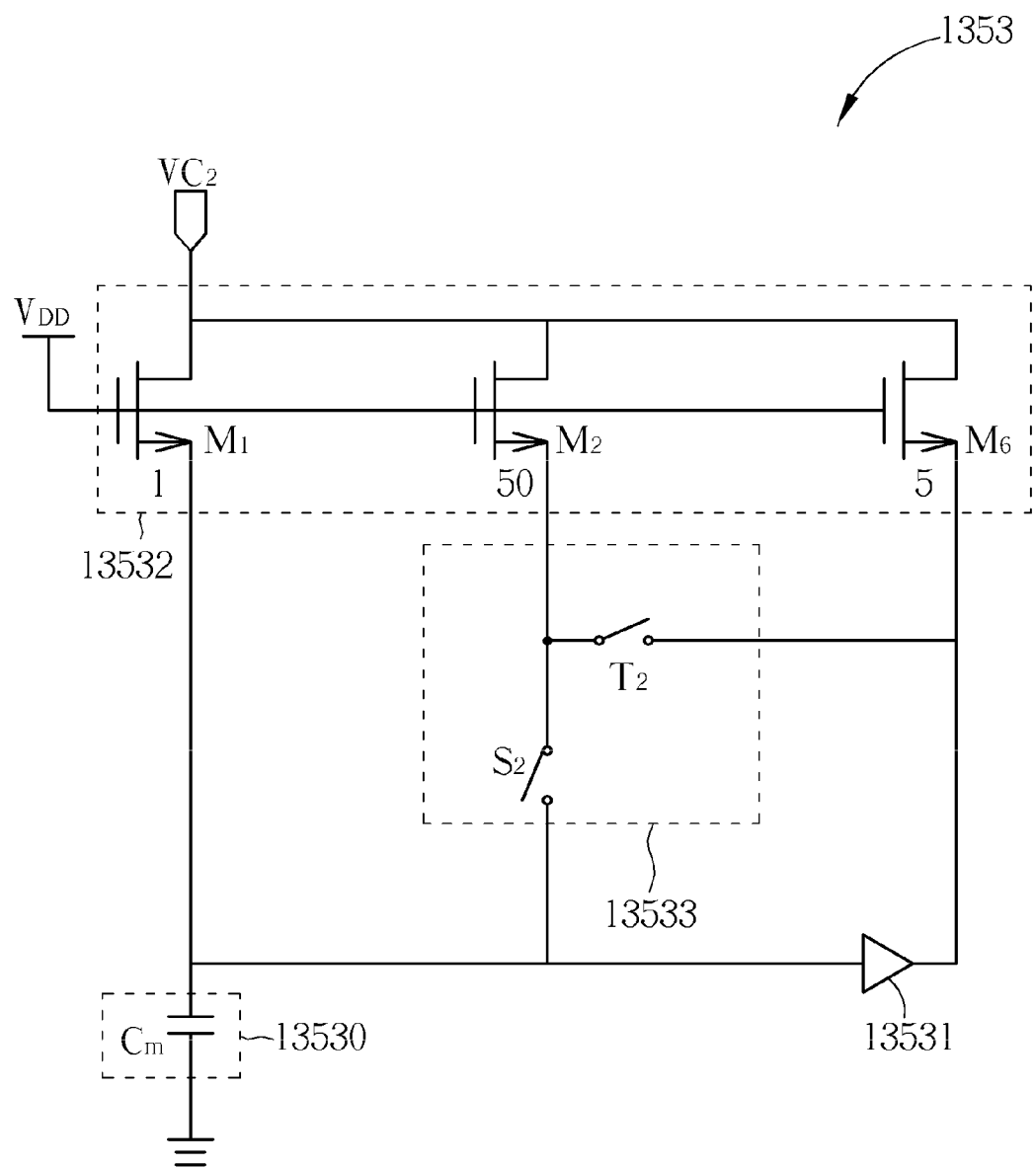
FIG. 2C is a diagram of the adaptive capacitive component shown in FIG. 1 according to another exemplary embodiment of the present invention.

Detailed descriptions about operations of the adaptive capacitive component 1353 at the second gradational transient state are similar to those at the first gradational transient state, so they are omitted here for the sake of brevity. Furthermore, there is no limitation of the numbers of transistors used in the current mirror circuit 13532. For instance, if the transistor $M_1$ is regarded as a first transistor and the transistor $M_6$ is regarded as a second transistor, the adaptive capacitive component 1353 can also be implemented with the first transistor, the second transistor, and at least a third transistor (e.g. the transistor $M_2$). The switching circuit can therefore be implemented with at least two switching components. FIG. 2C shows a detailed circuitry including fewer transistors. In short, the foregoing implementations of the adaptive capacitive component 1353 are only exemplary embodiments for describing operations of adaptive capacitive component 1353, so any other alternative circuit scheme of the adaptive capacitive component 1353 also falls within the scope of the present invention. Additionally, in order to achieve the best effects of pole-zero cancellation, the variations of the resistance of the adaptive resistive component 1351 are designed to be relevant to the load state of the voltage conversion apparatus 100 in this embodiment since the frequency variations of the non-dominant pole is also relevant to the load state of the voltage conversion apparatus 100.

Figure 3:
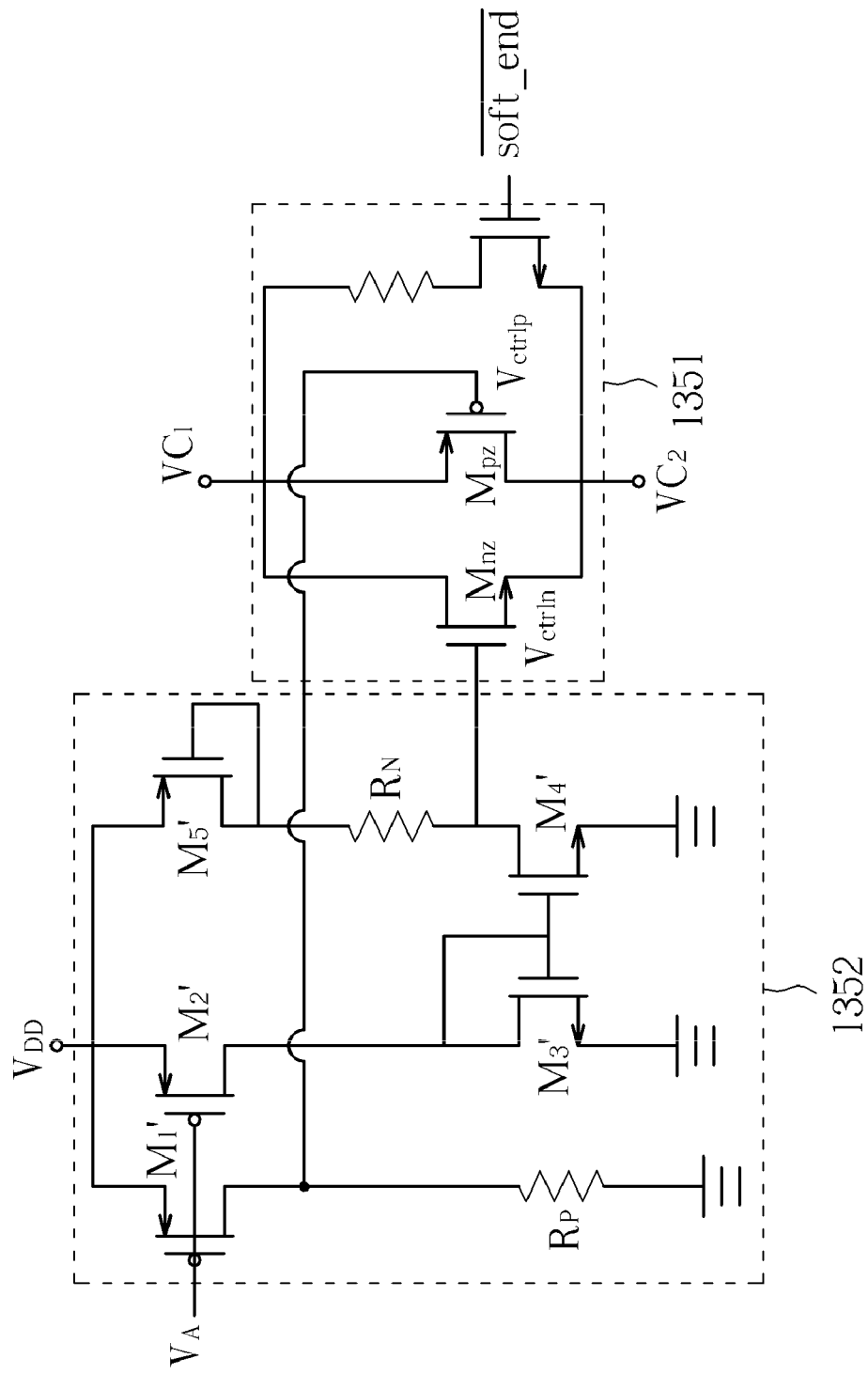
FIG. 3 is a diagram of the adaptive resistive component and the resistance control circuit shown in FIG. 1 according to one exemplary embodiment of the present invention.

Please refer to FIG. 3, which illustrates a diagram of the adaptive resistive component 1351 and the resistance control circuit 1352 shown in FIG. 1. The adaptive resistive component 1351 and the resistance control circuit 1352 are utilized for forming a dynamic compensation zero of the system in order to cancel the system pole (E.G. the non-dominant pole) for the purpose of obtaining a stable single-pole system. As this non-dominant pole is relevant to the load state, the dynamic compensation zero is also designed to be relevant to the load state in this embodiment. As shown in FIG. 3, after the "soft start" step of the system ends up, the signal soft_end will be at a low voltage level, and the resistance of the adaptive resistive component 1351 will be determined by two transistors $M_{pz}$ and $M_{nz}$ operated in the linear region. Therefore, the resistance control circuit 1352 can change the resistance of the adaptive resistive component 1351 by controlling the gate voltages of the transistors $M_{pz}$ and $M_{nz}$. The sensing signal $S_{load}$, which is the voltage signal generated by the sensing circuit 130 and is related to the load current, can be regarded as a signal $V_A$ shown in FIG. 3. The signal $V_A$ can be expressed as follow:

$$V_A = K_A \times I_{load} \times R_{SH} \qquad \text{equation (1);}$$

wherein $K_A$ keeps as a constant, $I_{load}$ stands for the amount of the current, and $R_{SH}$ represents for resistance. As expressed in equation (1), the signal $V_A$ varies with the variations of the load current $I_{load}$. Accordingly, the resistance control circuit 1352 utilizes the signal $V_A$ as an input signal to generate the gate voltages $V_{ctrln}$ and $V_{ctrlp}$ for controlling the transistors $M_{pz}$ and $M_{nz}$ operated in the linear region in order to generate the equivalent compensation resistances. The voltage signals $V_{ctrln}$ and $V_{ctrlp}$ can be expressed as follows:

$$V_{ctrlp} = g_{m1} \times (V_{DD} - V_A - |V_{tp1}|) \times R_P, ; \qquad \text{equation (2)}$$

$$V_{ctrln} = V_{DD} - g_{m2} \times (V_{DD} - V_A - |V_{tp2}|) \times \left(\frac{1}{g_{m5}} + R_N\right) + |V_{tp5}|, ; \qquad \text{equation (3)}$$

wherein $g_{m1}$, $g_{m2}$, and $g_{m5}$ are respectively the transductances of the p-type transistors $M_1'$, $M_2'$ and $M_5'$, and $|V_{tp1}|$, $|V_{tp2}|$, and $|V_{tp5}|$ are respectively the threshold voltages of the transistors $M_1'$, $M_2'$ and $M_5'$, and $R_P$ and $R_N$ are respectively the resistances of the two resistors inside the resistance control circuit 1352.

Then, the following equations can be obtained according to the equation (2) and the equation (3):

$$\frac{1}{R_{zp}} = K_{M_{pz}} \times [g_{m1} \times (V_{DD} - V_A - |V_{tp1}|) \times R_P - |V_{pz}|], \qquad \text{equation (4)}$$

$$\frac{1}{R_{zn}} = K_{M_{nz}} \times \left[ V_{DD} - g_{m2} \times (V_{DD} - V_A - |V_{tp2}|) \times \left(\frac{1}{g_{m5}} + R_N\right) + |V_{tp5}| - V_{tnz} \right] \qquad \text{equation (5)}$$

$$\frac{1}{R_z} = \frac{1}{R_{zp}} + \frac{1}{R_{zn}} = k' \times V_A + D, \qquad \text{equation (6)}$$

$$\omega_z = \frac{1}{R_z \times C_c} = \frac{k' \times V_A + D}{C_c} = k'' \times \frac{I_{load}}{C_c} + D', \qquad \text{equation (7)}$$

wherein the $R_{zp}$ and $R_{zn}$ are the respective on-resistances when the transistors $M_{pz}$ and $M_{nz}$ are turned on, $R_z$ is the resistance of the adaptive resistive component, and the value of $\omega_z$ is the frequency of the dynamic compensation zero. As expressed in equation (7), in this embodiment, the frequency of the dynamic compensation zero and the load state are relevant and have a directly proportional relationship. For instance, when the condition that the voltage conversion apparatus 100 is a light load state becomes the condition that the voltage conversion apparatus 100 is a heavy load state, the location of the dynamic compensation zero moves to that of higher frequency, which is the same direction to which the system pole moves. Thus, the adaptive compensation circuit 135 can adjust the frequency of the system zero $\omega_z$ of the voltage conversion apparatus at different load states according to the sensing signal $S_{load}$ to cancel the system pole. The objective of pole-zero cancellation is indeed accomplished, thereby making the voltage conversion apparatus 100 as a single-pole system at the steady state (the light load state or the heavy load state).

Figure 4A:
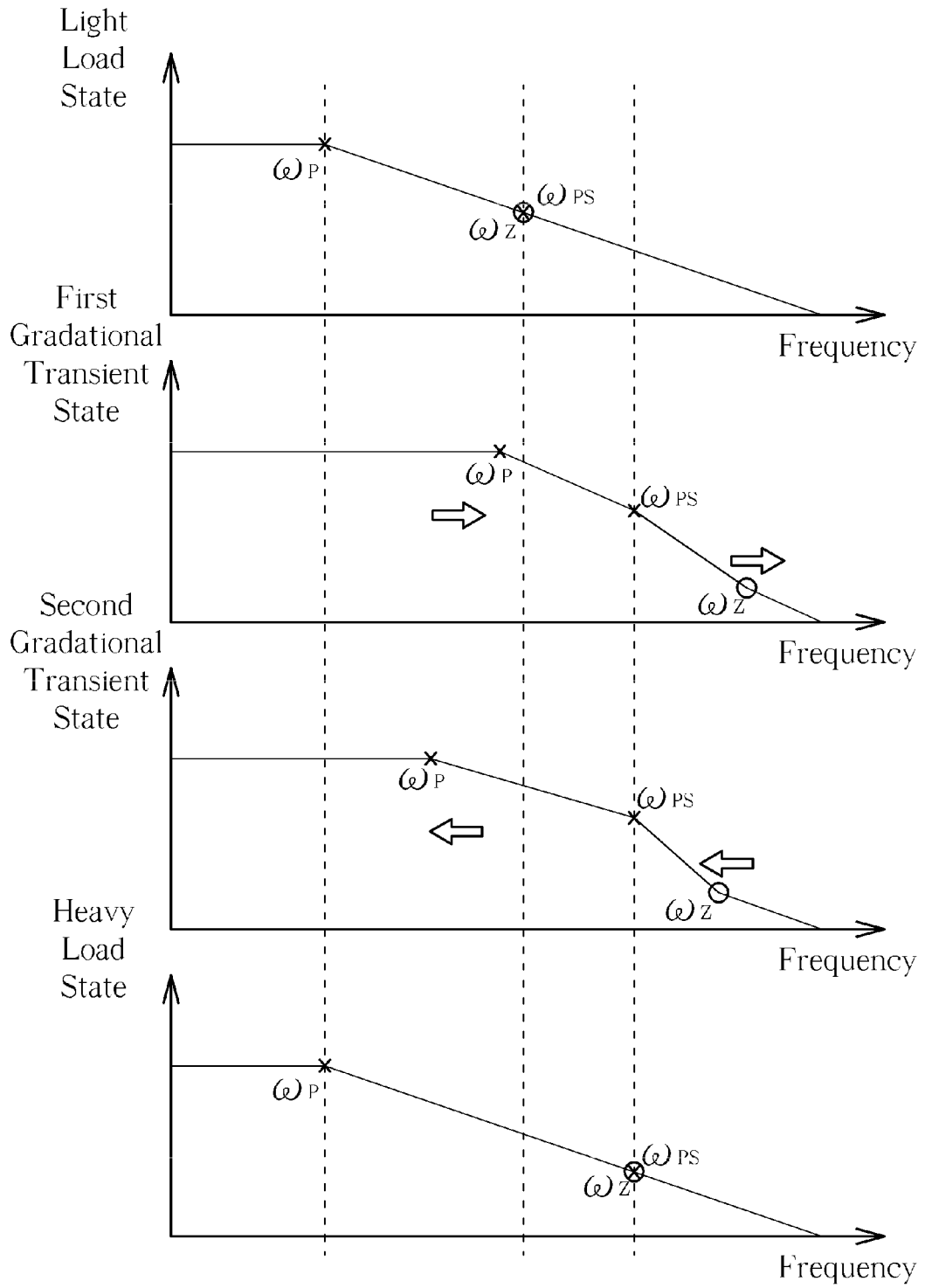
FIG. 4A is a diagram showing the frequency responses regarding each step of the voltage conversion apparatus shown in FIG. 1 from a light load state to a heavy load state.
Figure 4B:
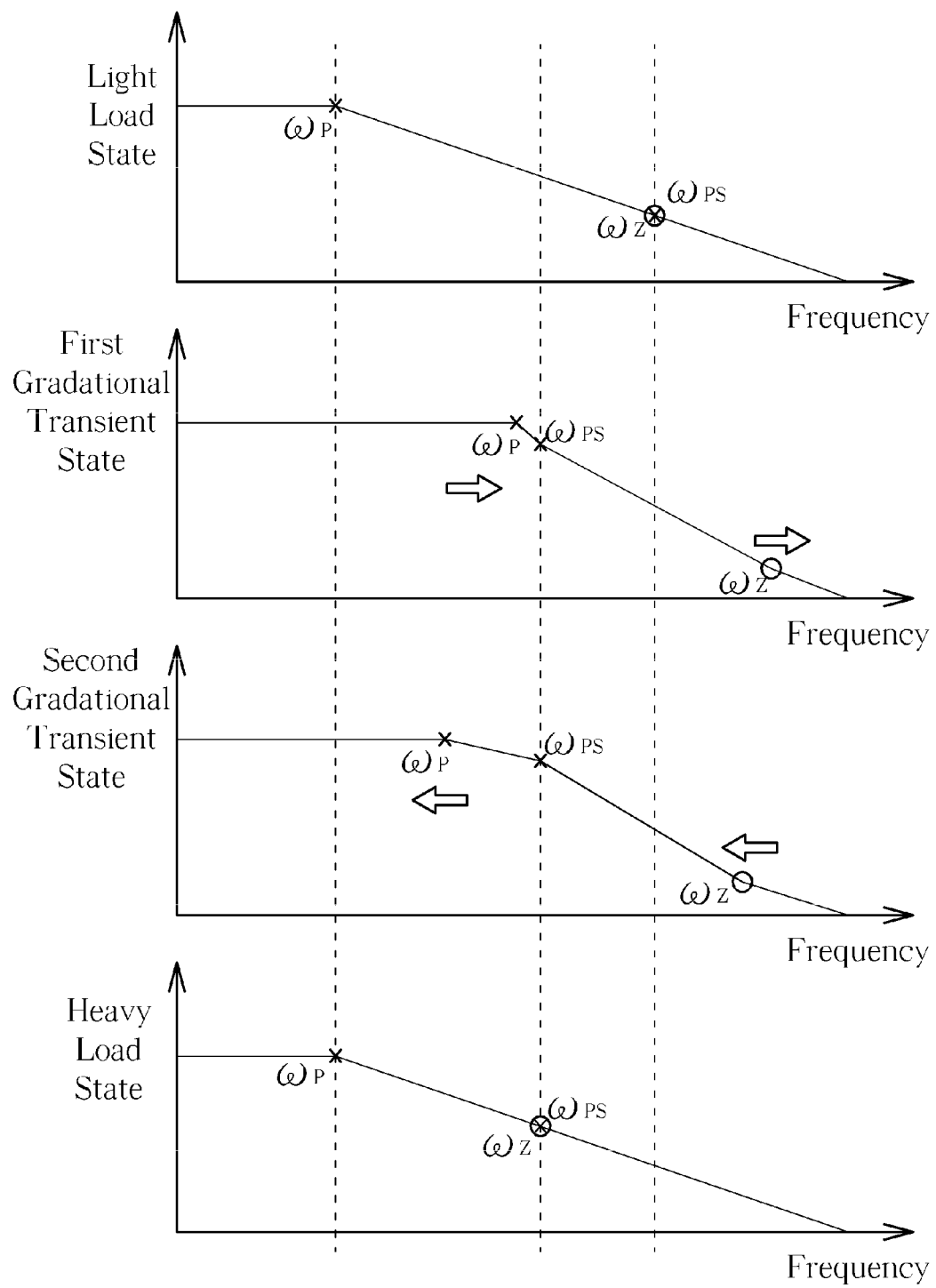
FIG. 4B is a diagram showing the frequency responses regarding each step of the voltage conversion apparatus shown in FIG. 1 from a heavy load state to a light load state.

The frequency responses of the voltage conversion apparatus 100 regarding variations of the load sate are illustrated in FIG. 4A and FIG. 4B. FIG. 4A is a diagram showing the frequency responses of the voltage conversion apparatus 100 shown in FIG. 1 corresponding to each step of the transition from the light load state to the heavy load state. As shown in FIG. 4A, when the voltage conversion apparatus 100 is at a light load state, in addition to the system dominant pole $\omega_p$ at the low frequency, another pole $\omega_{ps}$ of the voltage conversion apparatus 100 is cancelled by the dynamic compensation zero $\omega_z$, thereby making the voltage conversion apparatus 100 become a single-pole system. When the voltage conversion apparatus 100 enters the first gradational transient state, the adaptive compensation circuit 135 will adaptively compensate the control signal $VC_1$ according to the sensing signal $S_{load}$. Accordingly, the adaptive capacitive component 1353, which originally had a larger capacitance at the steady state, currently has a smaller capacitance. Consequently, the system bandwidth increases, and the frequencies of the zeroes $\omega_z$ and the poles $\omega_p$ and $\omega_{ps}$ all become higher.

In other words, the bandwidth of the voltage conversion apparatus 100 will be greatly increased, so the voltage conversion apparatus 100 can adjust the generated converted voltage $V_{out}$ according to the instant variations of the load state. Then, the voltage conversion apparatus 100 enters the second gradational transient state, wherein the capacitance control circuit 1354 controls each switching component in the adaptive capacitive component 1353 shown in FIG. 2A, thereby magnifying the capacitance of the adaptive capacitive component 1353 without recovering the capacitance to be the original value at the steady state (the light load or the heavy load). Thus, the voltage conversion apparatus 100 still has a larger bandwidth, and can rapidly adjust the converted voltage $V_{out}$ according to the variation of the load 105. Additionally, the dynamic compensation zero $\omega_z$ will approach the frequency of the pole $\omega_{ps}$ caused at the heavy load state due to the relationship between the zero frequency and the load state as expressed in equation (7). As a result, when the voltage conversion apparatus 100 from the second gradational transient state changes to be operated at the heavy load state, the dynamic compensation zero and the pole can be mutually cancelled as shown in the figure, thereby making the voltage conversion apparatus 100 also as a single-pole system at the heavy load state. The phase margin of the system will be increased to prevent form the instability due to the excess bandwidth.

FIG. 4B is a diagram showing the frequency responses of the voltage conversion apparatus 100 shown in FIG. 1 corresponding to each step from the heavy load state to the light load state. As shown in FIG. 4B, from the heavy load state to a light load state, the capacitances of the adaptive capacitive component 1353 at the first gradational transient state and the second gradational transient state are both smaller than that at the steady state. This is because that the adaptive compensation circuit 135 can increase the frequency of dominant pole $\omega_p$ when the voltage conversion apparatus 100 is operated at the transient state of different loads in order to increase the system bandwidth of the voltage conversion apparatus 100. When the voltage conversion apparatus 100 has the larger bandwidth, it can adjust the converted voltage $V_{out}$ rapidly. When the voltage conversion apparatus 100 is operated at the heavy load state, the dynamic compensation zero $\omega_z$ and the pole $\omega_{ps}$ are mutually cancelled due to the relationship expressed in equation (7), thereby making the voltage conversion apparatus 100 a single-pole system. Since the detailed descriptions about these operations are similar to those when the operating state of the voltage conversion apparatus from a light load state becomes a heavy load state as shown in FIG. 4A, they are omitted here for the sake of brevity.

Furthermore, there is no limitation in the present invention that the adaptive resistive component 1351 and the resistance control circuit 1352 must be disposed together with the adaptive capacitive component 1351 and the capacitance control circuit 1354 in a same apparatus. That is, in another embodiment, utilizing the adaptive resistive component 1351, the resistance control circuit 1352, and the conventional large capacitor also can achieve the objective of a cancellation between the dynamic compensation zero and the system non-dominant pole at the steady state. In other embodiments, utilizing the adaptive capacitive component 1353, the capacitance control circuit 1354, and the conventional resistor with fixed resistance can also achieve the objective of disposing the compensation capacitor which forms the dominant pole into an IC for the purpose of decrease pin count and increasing the response speed to the variation of the load when the system is operated at the transient state.

Moreover, even though the sensing signal $S_{load}$ is generated by the load current $I_{load}$ or the node current of the output terminal of the switching circuit 110 in the descriptions of the above-mentioned embodiment, it is, however, also possible that the sensing signal $S_{load}$ is generated by detecting the load voltage of the voltage conversion apparatus 100 or by detecting any node signal of the current mode DC-to-DC conversion circuit 102. Accordingly, the sensing signal can also be implemented with a current signal in other embodiments. In other words, there can be additional circuitry designed for the resistance control circuit 1352 shown in FIG. 3 to generate the voltage signal $V_{ctrin}$ and $V_{ctrip}$ from the current sensing signal $S_{load}$. All modified and alternative implementations fall within the spirits of the present invention.

Those skilled in the art will readily observe that numerous modifications and alterations of the device and method may be made while retaining the teachings of the invention.

What is claimed is:

1. A voltage conversion apparatus, for converting an input voltage to output a converted voltage to a load, the voltage conversion apparatus comprising:
    a DC-to-DC conversion circuit, for performing a DC conversion on the input voltage to output the converted voltage;
    a sensing circuit, for determining an operating state of the DC-to-DC conversion circuit and generating a sensing signal;
    a compensation circuit, coupled to the sensing circuit and the DC-to-DC conversion circuit, for compensating the DC-to-DC conversion circuit to adjust a bandwidth of the voltage conversion apparatus in accordance with the sensing signal;
    wherein the compensation circuit adjusts the bandwidth corresponding to a first bandwidth when the operating state is a transient state; wherein the compensation circuit adjusts the bandwidth corresponding to a second bandwidth when the operating state is a steady state; and wherein the first bandwidth is larger than the second bandwidth.

2. The voltage conversion apparatus of claim 1, wherein the DC-to-DC conversion circuit comprises:
    a first switching circuit, for receiving the input voltage and determining whether to transmit the input voltage to output an output voltage according to a pulse width modulation (PWM) signal;
    a filter, coupled to the first switching circuit, for filtering the output signal and outputting the converted voltage to the load;
    an error amplifier, coupled to the filter, for amplifying an error between a feedback voltage and a reference voltage to generate a control signal, wherein the feedback voltage corresponds to the converted voltage; and
    a PWM circuit, coupled to the error amplifier, for generating the PWM signal according to the control signal;
    wherein, the compensation circuit is utilized for compensating the control signal to adjust the bandwidth of the voltage conversion apparatus.

3. The voltage conversion apparatus of claim 2, wherein the sensing circuit is configured to sense a current state of the output signal.

4. The voltage conversion apparatus of claim 1, wherein the DC-to-DC conversion circuit is a current mode DC-to-DC buck converter.

5. The voltage conversion apparatus of claim 1, wherein when the operating state is the steady state, the compensation circuit adaptively compensates the DC-to-DC conversion circuit to perform a cancellation between a zero and a pole of the voltage conversion apparatus according to the sensing signal.

6. The voltage conversion apparatus of claim 5, wherein the compensation circuit comprises a resistive component and a resistance control circuit, and the resistance control circuit adjusts a resistance of the resistive component to perform the cancellation between the zero and the pole according to the sensing signal.

7. The voltage conversion apparatus of claim 1, wherein when the operating state is the transient state, the compensation circuit adaptively compensates the DC-to-DC conversion circuit to increase a frequency regarding a pole of the voltage conversion apparatus to increase the bandwidth.

8. The voltage conversion apparatus of claim 7, wherein the compensation circuit comprises a capacitive component and a capacitance control circuit and the capacitance control circuit adjusts a capacitance of the capacitive component to increase the bandwidth.

9. The voltage conversion apparatus of claim 8, wherein the capacitive component comprises:
    a capacitor, having a fixed capacitance;
    a voltage follower; and
    a current mirror circuit, having a plurality of transistors forming a current mirror scheme, the current mirror circuit comprising:
    a first transistor, coupled to the input terminal of the voltage follower and the capacitor;
    a second transistor, coupled to the output terminal of the voltage follower; and
    at least a third transistor; and
    a second switching circuit, coupled between the third transistor and the voltage follower;
    wherein the capacitance control circuit controls the second switching circuit, and adjusts the amount of the current flowing into the capacitor according to the sensing signal in order to adjust the capacitance of the capacitor component.

10. The voltage conversion apparatus of claim 1, wherein the compensation circuit comprises a capacitive component; when the operating state is the steady state, the capacitive component has a first capacitance; and when the operating state is the transient state, the capacitive component has a second capacitance; the first capacitance being larger than the second capacitance.

11. The voltage conversion apparatus of claim 1, wherein the compensation circuit comprises a capacitive component and the capacitive component has a variable capacitance.

12. The voltage conversion apparatus of claim 1, wherein the compensation circuit comprises a capacitive component and the capacitive component is disposed in a chip.

13. A voltage conversion apparatus, comprising:
   a DC-to-DC conversion circuit configured to perform a DC conversion on an input voltage to generate a converted voltage;
   a sensing circuit configured to determine an operating state of the DC-to-DC conversion circuit and generate a sensing signal; and
   a compensation circuit coupled to the sensing circuit and the DC-to-DC conversion circuit, the compensation circuit configured to compensate a control signal of the DC-to-DC conversion circuit to adjust a bandwidth of the voltage conversion apparatus based on the sensing signal, wherein the compensation circuit comprises:
   a capacitance control circuit; and
   a capacitive component, wherein the capacitive component further comprises a current mirror comprising:
      a first transistor coupled to the input terminal of a voltage follower in the capacitive component and a capacitor;
      a second transistor coupled to the output terminal of the voltage follower;
      a third transistor; and
      a second switching circuit, coupled between the third transistor and the voltage follower, wherein the capacitance control circuit controls the second switching circuit and adjusts the amount of current flowing into the capacitor according to the sensing signal.

14. The voltage conversion apparatus of claim 13, wherein the sensing circuit is configured to determine whether the operating state of the voltage conversion apparatus is operating in either a transient state or a steady state.

15. The voltage conversion apparatus of claim 14, wherein the compensation circuit is configured to adjust the bandwidth such that the bandwidth corresponds to a first bandwidth when the operating state is the transient state;
   wherein the compensation circuit adjusts the bandwidth such that the bandwidth corresponds to a second bandwidth when the operating state is the steady state; and
   wherein the first bandwidth is larger than the second bandwidth.

16. A voltage conversion apparatus, comprising:
   a DC-to-DC conversion circuit configured to perform a DC conversion on an input voltage to generate a converted voltage;
   a sensing circuit configured to generate a sensing signal based on the DC-to-DC conversion circuit operating in either a steady state or a transient state; and
   a compensation circuit coupled to the sensing circuit and the DC-to-DC conversion circuit, the compensation circuit configured to adjust a bandwidth of the voltage conversion apparatus based on the sensing signal, wherein the compensation circuit comprises:
   a capacitance control circuit; and
   a capacitive component, wherein the capacitive component further comprises a current mirror comprising:
      a first transistor coupled to the input terminal of a voltage follower in the capacitive component and a capacitor;
      a second transistor coupled to the output terminal of the voltage follower;
      a third transistor; and
      a second switching circuit, coupled between the third transistor and the voltage follower, wherein the capacitance control circuit controls the second switching circuit and adjusts the amount of current flowing into the capacitor according to the sensing signal.

17. The voltage conversion apparatus of claim 16, wherein the DC-to-DC conversion circuit comprises a buck converter, and wherein the DC-to-DC conversion circuit comprises:
   a switching circuit configured to receive the input voltage and generate an output voltage according to a pulse width modulation (PWM) signal;
   a filter coupled to the switching circuit, the filter configured to filter the output signal and output the converted voltage to a load coupled to the voltage conversion apparatus;
   an error amplifier coupled to the filter, the error amplifier configured to amplify an error between a feedback voltage and a reference voltage to generate a control signal, wherein the feedback voltage corresponds to the converted voltage; and
   a PWM circuit, coupled to the error amplifier, the PWM circuit configured to generate the PWM signal according to the control signal.

18. The voltage conversion apparatus of claim 17, wherein the compensation circuit comprises a capacitive component having a variable capacitance.

19. The voltage conversion apparatus of claim 16, wherein the capacitance control circuit is configured to adjust a capacitance of the capacitive component to increase the bandwidth of the voltage conversion apparatus.

20. The voltage conversion apparatus of claim 16, wherein the compensation circuit is configured to adaptively to increase a frequency of a pole of the voltage conversion apparatus responsive to the DC-to-DC conversion circuit operating in the transient state.

* * * * *